Dec. 29, 1936.  W. SWALLOW  2,066,019
VEHICLE CHASSIS FRAME
Filed Aug. 4, 1934  4 Sheets-Sheet 1
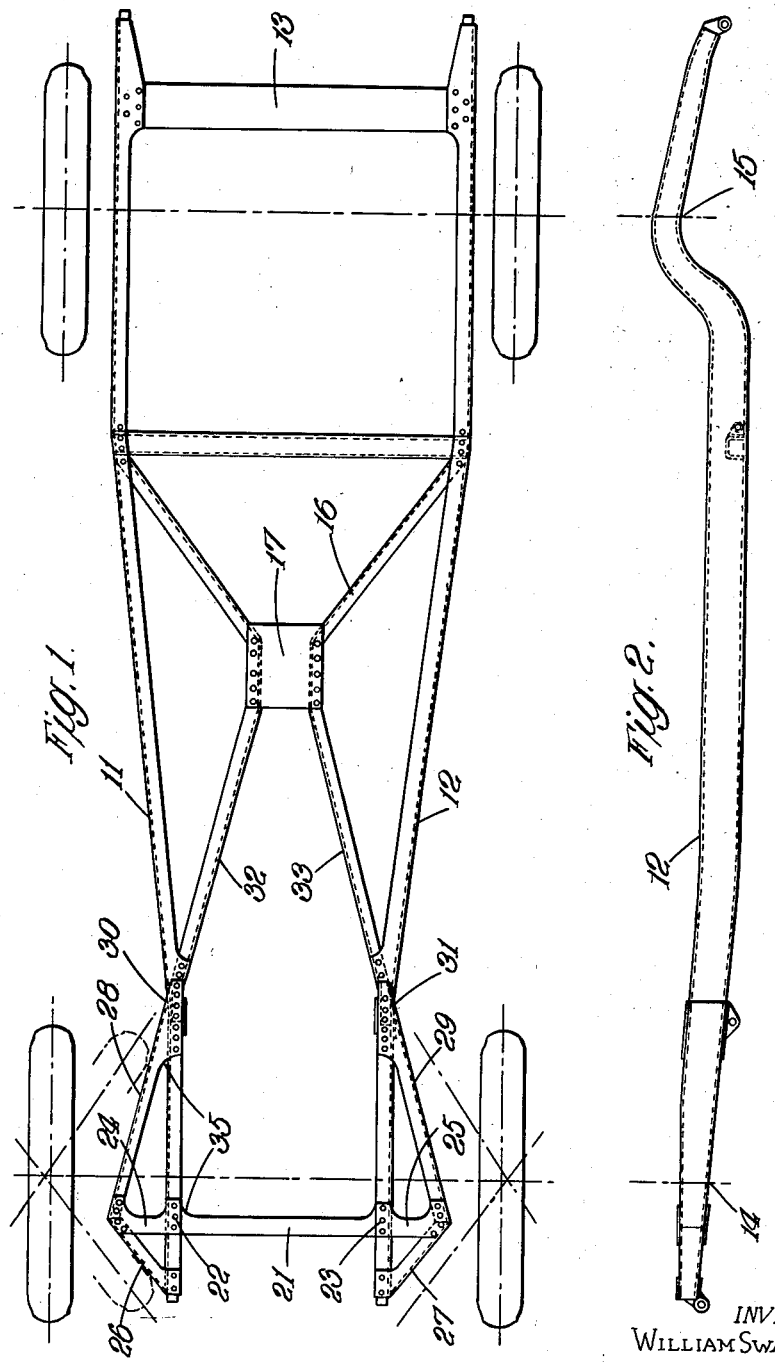
INVENTOR
WILLIAM SWALLOW.
BY
ATTORNEY Dec. 29, 1936.  W. SWALLOW  2,066,019
VEHICLE CHASSIS FRAME
Filed Aug. 4, 1934  4 Sheets-Sheet 2
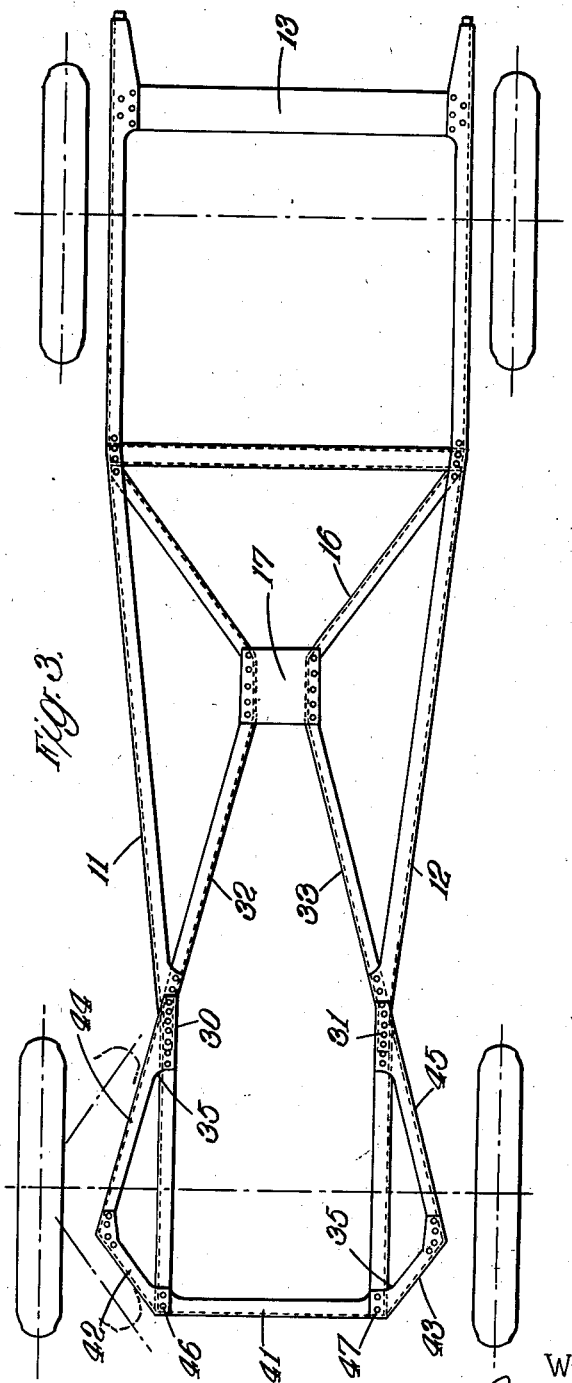
INVENTOR
WILLIAM SWALLOW
BY
ATTORNEY

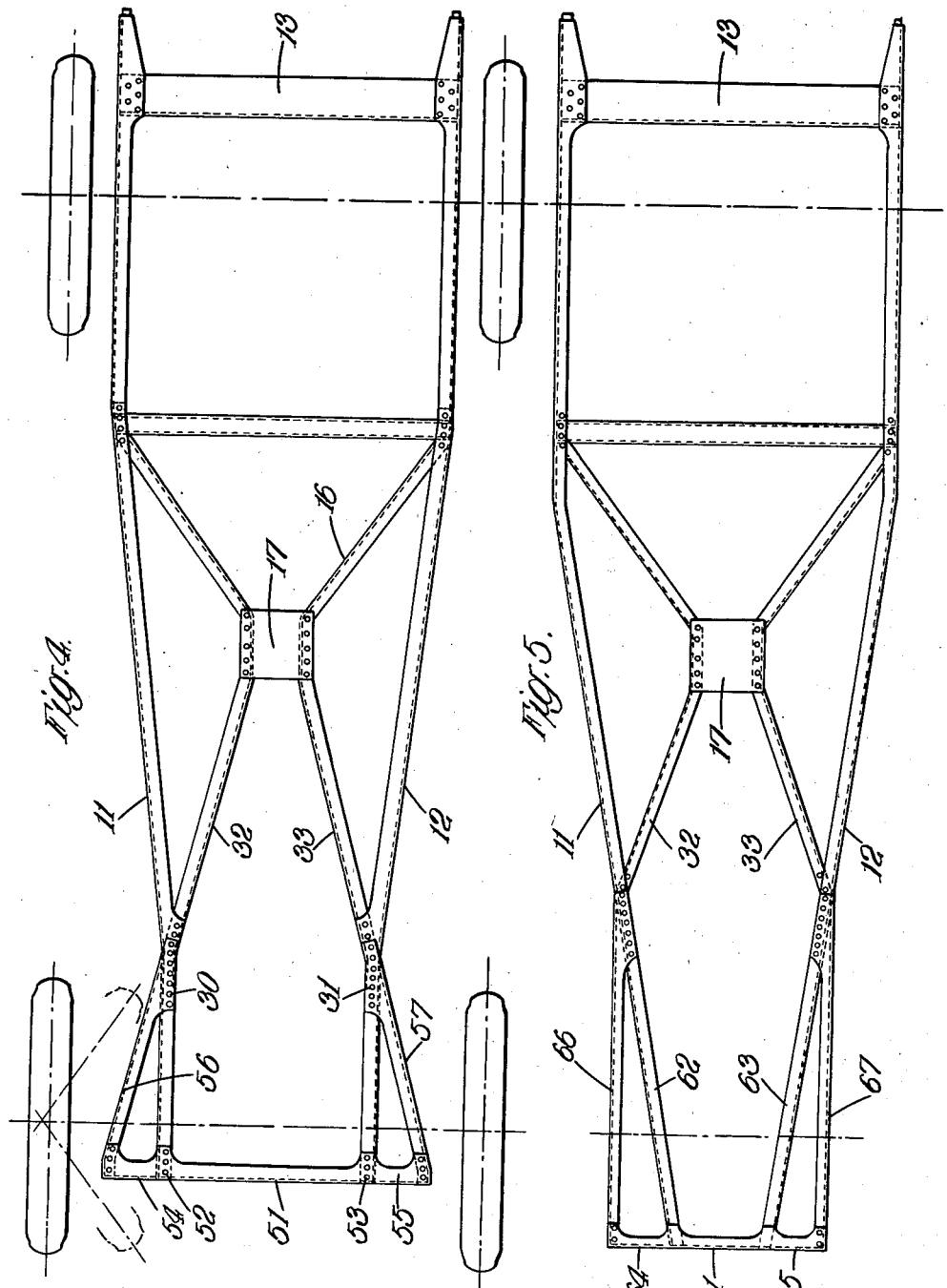

Dec. 29, 1936.  W. SWALLOW  2,066,019
VEHICLE CHASSIS FRAME
Filed Aug. 4, 1934  4 Sheets-Sheet 4
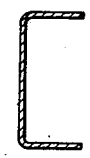  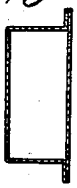 
Fig. 6.  Fig. 7.  Fig. 8.  Fig. 9.
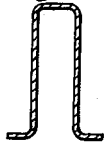  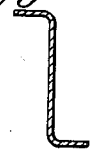 
Fig. 10.  Fig. 11.  Fig. 12.  Fig. 13.
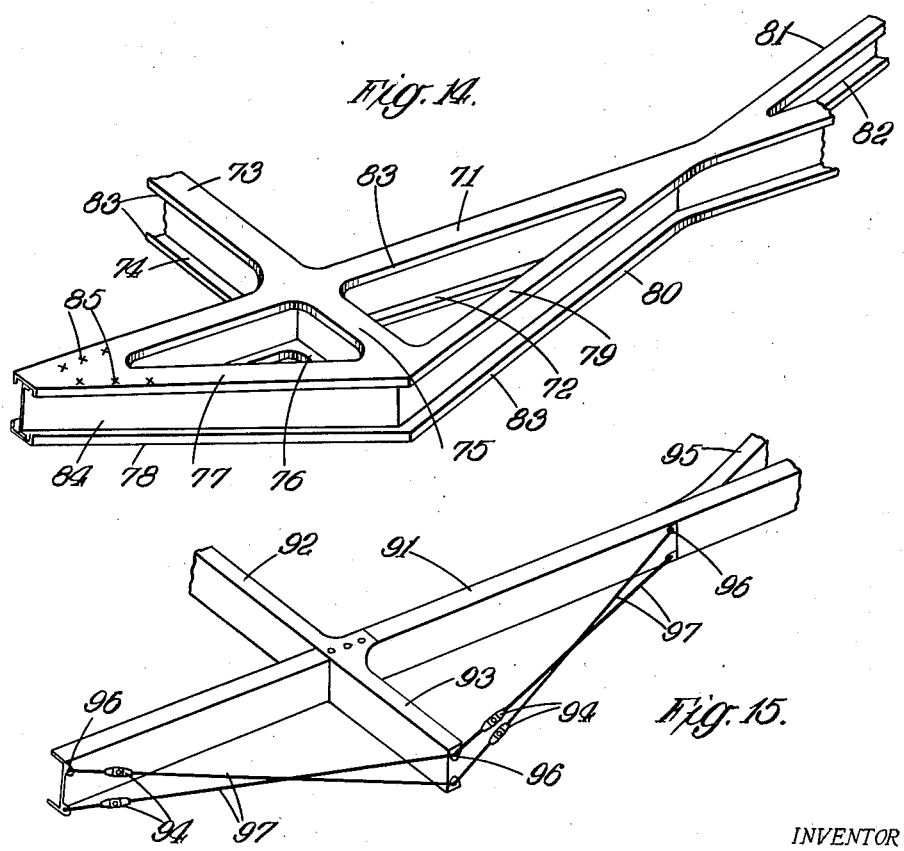
Fig. 14.
Fig. 15.
INVENTOR
WILLIAM SWALLOW.
BY 
ATTORNEY Patented Dec. 29, 1936

2,066,019

UNITED STATES PATENT OFFICE 2,066,019

VEHICLE CHASSIS FRAME

William Swallow, Headington, Oxford, England, assignor to The Pressed Steel Company of Great Britain Limited, Cowley, Oxford, England, a British company Application August 4, 1934, Serial No. 738,385
In Great Britain August 25, 1933

8 Claims. (Cl. 280—106)

The trend in modern design of vehicle and like chassis frames is toward rigidity of construction and lightness in weight, although the chassis frame is not necessarily as rigid as is possible as it is found that, particularly in the case of all-steel bodies, the body gives a very large proportion of the necessary rigidity. It is, however, desirable that the chassis should possess a certain degree of stiffness and rigidity and lightness in weight, in order to obtain a maximum power/weight ratio in the complete vehicle.

Generally, rigidity of construction and lightness of weight are incompatible as, to obtain rigidity, heavy section for the frame must be employed.

There have been many proposals, however, to obtain this desideratum, such as constructing a frame of side members of box section, connecting the side members by transverse bracing members of e. g. cruciform shape, and further by connecting the longitudinal and transverse members by torsion resisting joints.

It is found that in most cases the weakest part of a chassis frame is that forward of the front of the body, that is to say, that part which supports the engine and the front wheel springs, the remaining portion of the frame being, of course, stiffened additionally by bolting the body thereto. It is difficult to strengthen this weak front portion of the chassis by cross bracing members as space must be left between the longitudinals for the engine and transmission gear.

It is the object of the present invention to provide a chassis frame which combines great strength and rigidity and lightness of weight and in which the front portions of the frame are strengthened without sacrifice of space for the engine and transmission gear. The construction of the chassis frame of this invention is such as to obtain the necessary rigidity in the structure and not in the cross section of the material employed, so that, lightness of weight can be attained readily.

The invention will now be described with reference to the accompanying drawings of which Figure 1, is a plan view of a chassis constructed in accordance with one form thereof, and Figure 2 is a side elevation of the chassis shown in Figure 1. Figures 3, 4 and 5 are views similar to Figure 1 showing modifications of the invention. Figures 6 to 13 are enlarged views showing several modifications of the sections employed for the longitudinal side sills and the bracing members, whilst Figure 14 is an enlarged part perspective view of a further modification of the outrigger and Figure 15 is an enlarged part perspective view of yet a further modification.

In Figures 1 and 2, the chassis frame comprises a pair of longitudinal side sills, 11, 12 of a channel or box section interconnected at their rear ends by a transverse member 13, of channel, box or tubular section. The side sills 11 and 12 are upwardly inclined at their forward ends at 14 and at their rear ends at 15, to accommodate the vehicle wheels and springs (not shown). Substantially midway of the length of the side sill 11 and 12 is secured the cruciform bracing member 16, strengthened at the centre by plates 17.

Forward of the normal front line of the body, or forward of the junction of the cruciform member 16 with the side sills 11, 12 are secured the outrigger bracing members. Spaced a short distance from the front of the side sills is a transverse bracing member 21 of channel or box section, adapted to pass through the longitudinal members 11, 12 and to terminate a short distance outside thereof, or to be secured to said side sills and to be provided with extension members lying outside said side sills, such an arrangement representing a beam 21 built in at both ends as at 22, 23 and formed with cantilever extensions 24, 25. From the front of the side sills 11, 12 to the outer ends of the cantilever beams 24, 25, extend channel or other section members 26, 27 whilst second similar members 28, 29 run rearwardly from the outer ends of the cantilever beams 24, 25 to the sides of the longitudinals 11, 12 to be secured thereto at 30, 31, adjacent the junction of the arms 32, 33 of the cruciform bracing member 16 with said longitudinals. These members 24, 26, 28 and 25, 27, 29 constitute the outrigger bracing members and whilst they are shown to be riveted, the structure could be welded equally well, whilst for strengthening purposes gusset plates (not shown) might be employed or alternatively the several members may be flared, as indicated at 35, additionally for ease of assembly. The members 26, 28 and 27, 29 are shown as two separate members, but they may also be formed each of a one-piece section, bent to an obtuse angle, the apex of which is secured to the outer ends of the cantilever beam 24 or 25.

In Figure 3, the front end transverse bracing member 41 is secured at the front ends of the longitudinals 11, 12 and the outrigger bracing members 42, 44 and 43, 45 secured at 46, 47 and 30, 31 to the side sills 11, 12 are in the form of triangular struts; the members 44, 45 may be formed as extensions of the portions 32, 33 of the cruciform bracing member or if formed in two portions may be strengthened at the joints by gusset plates (not shown) to present a substantially continuous beam.

At those portions of the frame not subjected to severe bending or torsional stresses the sections may be perforated for lightness.

In Figure 4, the forward transverse bracing member 51, is shown at the front ends of the forward lineal extensions of the longitudinals 11, 12 and is somewhat similar to the arrangement shown in Figure 1; it comprises the beam 51 built in at both ends at 52, 53 and formed with cantilever extension beams 54, 55, to the outer ends of which are secured the members 56, 57 extending rearwardly to join the side sills 11, 12 at 30, 31 in the vicinity of the junction of the members 32, 33 of the cruciform member therewith, the members 54, 56 and 55, 57 constituting the outrigger bracing members.

In Figure 5 is shown a particular modification of Figure 4 wherein the front ends of the forward lineal extensions of the side sills and the longer members of the outrigger are reversed in their relation to each other without altering their effect. In this case, the front ends 62, 63 of the forward lineal extensions of the side sills 11, 12 are continued straight through to the front transverse member 61, to lie inside the members 66, 67 of outriggers 64, 66 and 65, 67, the members 66, 67 conforming more nearly to the normal side sill contour, with the forward lineal extensions 62, 63 of the side sills 11, 12 constituting chordal members within the frame 61, and 66, 67.

Reference to Figures 6 to 13, will show the different types of sections which may be employed for the frame members of the several chassis described.

Figure 14 shows a modification of the invention, adaptable particularly for chassis for the lighter kind of vehicle, wherein the chassis comprises top and bottom unitary stampings 71, 72 including the transverse front member 73, 74 the cantilever portion 75, 76 the outriggers proper 77, 78 and 79, 80 and the cruciform bracing member 81, 82 in addition to the other usual transverse bracing members, (not shown) each of said stampings being formed with inturned edge flanges 83. These stampings constitute the flanges of H-section beams, completed by means of the channel section members 84, the bottoms of the channels constituting the webs of the H-section beams, the whole being spot welded, as indicated at 85.

Figure 15 shows a still further modification, in which tension wires, as in aeroplane practice, are employed for the outrigger. In this instance the longitudinal 91 of e. g. channel section is provided with the built in beam 92 and cantilever extension 93, as before; the front end of the longitudinal, the outer end of the cantilever extension 93, and the longitudinal 91, at approximately the junction of the cruciform member 95 therewith, are formed with eyeletted lugs 96, to which are attached the tension wires 97, which may be adjusted by turnbuckles such as 94 or the like, the assembly constituting the outrigger bracing structure.

From this construction it is to be observed that there will be a clear space between the front transverse bracing member, which is located towards the front of the chassis frame, the longitudinal side sills and the two halves of the intersecting portions of the cruciform member. This clear space is employed to accommodate all the automotive organs of the vehicle without trouble.

It will be clear from the foregoing that there is provided a chassis frame which possesses the advantage of rigidity of construction and lightness of weight, which is as cheap, if not cheaper, to produce than chassis of present type, which is very simple in construction, and particularly one which possesses rigidity in those areas unaffected by the stiffening of the body, namely forward of the front line of the body. This stiffening of the frame forward of the body is particularly desirable at the present time as the modern tendency is to mount the engine on rubber bushings whereby the rigidity normally provided by the engine mounting is lost, furthermore, lack of rigidity in the forward portions of the chassis frame conduces to undesirable wheel wobble and consequent ineffective vehicle control. It will also be clear that the arrangement of the outrigger bracing members does not affect the normal functioning or lock of the steering road wheels.

What I claim as my invention is:

1. A chassis frame for vehicles comprising a main framework including longitudinal side sill members reinforced by an X-frame, and outrigger extensions including forward lineal extensions of said X-frame extending outwardly of the sill members directly from the juncture of the arms of the X-frame with the sill members, said outrigger extensions forming with the forward ends of the sill members triangulated structures in plan.

2. A chassis frame for vehicles comprising a main framework, including longitudinal side sill members reinforced by an X-frame, and outrigger extensions comprising forward and outward lineal extensions of the forward arms of said X-frame directly from the juncture of the arms of the X-frame with the sill members, and braces connecting the forward ends of said extensions to the chassis sills and interbracing the forward ends of the chassis sills, said extensions, braces and the adjacent portions of the chassis sills forming triangulated structures in plan.

3. A chassis frame for vehicles comprising a main framework including longitudinal side sill members, a transverse beam connecting said sills adjacent their forward ends and extended laterally therebeyond to form outrigger extensions, and rearwardly and inwardly extending braces connecting the outer ends of said extensions with the chassis sill members, and internal bracing for the chassis sills comprising substantially direct lineal extensions of said braces.

4. A chassis frame for vehicles comprising a main framework including longitudinal side sill members, the forward ends of which are reinforced by outrigger extensions, said extensions each comprising brace members forming with the forward end of the adjacent sill a triangulated structure in plan, and a transverse bracing means interconnecting the outer portions of said outriggers and said chassis sill members and interbracing the chassis sill members.

5. A chassis frame for vehicles comprising a main framework including longitudinal side sill members, the forward ends of which are reinforced by outrigger extensions, said extensions each comprising an outward extension of a front cross brace between the chassis side members and a rearward and inwardly-extending brace, said outward extension, brace, and the adjacent portion of the sill forming a triangulated structure in plan, said rearwardly and inwardly-extending braces being aligned with internal bracing between the chassis sill members.

6. A chassis frame as claimed in claim 5 wherein the main framework and the outrigger extensions and cross braces are formed from top and bottom unitary sheet metal flanged stampings interconnected by sheet metal web members having flanges through which they are secured to the unitary top and bottom stamping.

7. A chassis frame as claimed in claim 4, in which the outrigger bracing members are comprised of tension wires.

8. A chassis frame for vehicles comprising a main framework including longitudinal side sill members reinforced by an X-frame joining the side sill members some distance rearwardly of forward ends of said sill members, and outrigger extensions extending the forward arms of said X-frame as lineal extensions outwardly and forwardly directly from the junction of the arms of the X-frame with the sill members, said extensions and the portions of the sill members projecting forwardly of their junction with the arms of the X-frame being transversely interbraced adjacent their forward ends.

WILLIAM SWALLOW.